No. 611,288. Patented Sept. 27, 1898.

L. M. SERBÁN.
THREE-SIDED CALK.
(Application filed Dec. 31, 1897.)

(No Model.)

Witnesses

Inventor
Lazar Mladen Serbán
by
L. K. Bohm,
Attorney

UNITED STATES PATENT OFFICE.

LAZAR MLADEN SERBÁN, OF VIENNA, AUSTRIA-HUNGARY.

THREE-SIDED CALK.

SPECIFICATION forming part of Letters Patent No. 611,288, dated September 27, 1898.

Application filed December 31, 1897. Serial No. 665,195. (No model.) Patented in Austria August 22, 1896, No. 46/3,257, and in Hungary August 21, 1897, No. 9,397.

*To all whom it may concern:*

Be it known that I, LAZAR MLADEN SERBÁN, a subject of the Emperor of Austria-Hungary, residing in the city of Vienna, in the Province of Lower Austria, in the Empire of Austria-Hungary, have invented certain new and useful Improvements in Three-Sided Calks, (for which I have obtained a patent in Austria, No. 46/3,257, dated August 22, 1896, and in Hungary, No. 9,397, dated August 21, 1897,) of which the following is a specification.

My invention relates to the production of three-sided calks possessing the advantage of never becoming blunt, because there are no parallel plane surfaces on my improved calks and they remain sharp until completely worn off.

My improvements apply to blunt as well as to sharp calks. Further, the weight of my three-sided calks is less than that of other calks heretofore employed. No care need be taken when screwing them on, because they are effective in any position and do not slide on the ground. The calks are easy to secure and to unscrew and enter or penetrate the ground easier than other calks.

My improved calks afford a sure protection until completely used up, as according to their special form no blunted edges or surfaces can occur.

The invention is illustrated in the accompanying drawings, in which—

Figure 1:
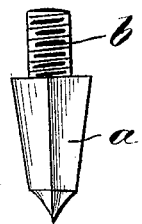
Figure 3:
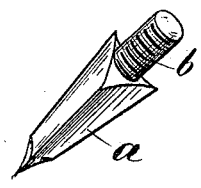
Figure 2:
Figure 4:
Figure 5:

Figure 1 is an elevation of a pyramid-like three-sided horseshoe-calk with grooved or concaved surfaces. Fig. 2 is a bottom view of Fig. 4, and Fig. 3 is a perspective view of Fig. 4. Fig. 4 is a cross-section of a calk of triangular section with equal shanks and plane surfaces. Fig. 5 is a section of a like calk with grooved or concaved surfaces, and Fig. 6 is a cross-section of a three-sided calk with inlaid india-rubber.

As may be seen from the drawings, the calks consist of a calk-body proper, $a$, of triangular section, which has either three equal sides forming an equilateral triangle, Figs. 1 to 3, or two equal sides forming an isosceles, Figs. 4 and 5, or unequal sides forming a scalene. To the calk-body is connected the threaded calk-bolt $b$ in any suitable manner. The side surfaces may be plane, Fig. 4, or they may be plain or straight, concaved or grooved, as shown in Figs. 1, 2, 3, and 5. The calk-body may be pyramid-like reduced with downward-converging side surfaces as sharp or pointed calks, as shown in Figs. 1, 2, and 3.

Figure 6:
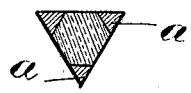

If desired, the calks may be inlaid with india-rubber or the like, as shown in Fig. 6.

The calks are manufactured in any desired size and of any suitable material—as, for instance, of cast or wrought iron, steel, or other metals.

Having thus described my invention, what I claim therein as new, and desire to secure by Letters Patent, is—

1. An improved calk consisting of a three-sided calk-body having pyramid-like converging side surfaces and forming at the lower end a second and short pyramid, and a threaded calk-bolt, as specified.

2. An improved calk consisting of a three-sided calk-body having pyramid-like converging, grooved or concaved side surfaces and forming at the lower end a second and short pyramid, and a threaded calk-bolt, as specified.

In testimony whereof I have signed this specification in presence of two subscribing witnesses.

LAZAR MLADEN SERBÁN.

Witnesses:
 HENRY C. CARPENTER,
 CHAS. E. CARPENTER.